United States Patent [19]

Lehner et al.

[11] Patent Number: 4,666,781

[45] Date of Patent: May 19, 1987

[54] MAGNETIC RECORDING MEDIA

[75] Inventors: August Lehner, Roedersheim-Gronau; Guenter Heil, Ludwigshafen; Jenoe Kovacs, Hessheim; Werner Balz, Limburgerhof; Werner Lenz, Bad Durkheim, all of Fed. Rep. of Germany

[73] Assignee: BASF Aktiengesellschaft, Fed. Rep. of Germany

[21] Appl. No.: 759,298

[22] Filed: Jul. 26, 1985

[30] Foreign Application Priority Data

Jul. 27, 1984 [DE] Fed. Rep. of Germany ....... 3427682

[51] Int. Cl.$^4$ .............................................. G11B 5/702
[52] U.S. Cl. ............................. 428/425.9; 252/62.54; 427/44; 427/128; 428/694; 428/900
[58] Field of Search .................... 428/425.9, 694, 695, 428/900; 427/44, 128; 252/62.54; 360/134–136

[56] References Cited

U.S. PATENT DOCUMENTS

| | | |
|---|---|---|
| 2,824,851 | 2/1958 | Hall et al. |
| 3,373,075 | 3/1968 | Fekete et al. |
| 3,836,492 | 9/1974 | Watanabe et al. |
| 4,004,997 | 1/1977 | Tsukamoto ........................ 428/900 |
| 4,328,282 | 5/1982 | Lehner ................................ 428/480 |
| 4,559,118 | 12/1985 | Heil .................................. 428/425.9 |
| 4,560,456 | 12/1985 | Heil .................................. 428/425.9 |

FOREIGN PATENT DOCUMENTS 2164386 12/1971 Fed. Rep. of Germany.

OTHER PUBLICATIONS

H. Fikentscher, Cellulose–Chemie, 30 (1931) S.58 ss siche: Cellulose–Chemie, 13 (1932).

*Primary Examiner*—Ellis P. Robinson
*Attorney, Agent, or Firm*—Keil & Weinkauf

[57] ABSTRACT

Magnetic recording media comprising a non-magnetic substrate and a magnetic layer comprising a finely divided magnetic material dispersed in an organic solvent soluble, crosslinkable, essentially linear, thermoplastic polyurethane which possesses acrylate side and terminal groups wherein said polyurethane is prepared by reacting poly- and/or diisocyanates with a mixture of (a) methacrylate - or acrylate - diols having molecular weights of from 146 to 3,000, (b) monoesters of methacrylic or acrylic acid and a diol having a molecular weight of from 116 to 300, and (c) other organic polydiol compounds which have molecular weights of from 400 to 5,000.

1 Claim, No Drawings

MAGNETIC RECORDING MEDIA

The present invention relates to magnetic recording media which comprise a non-magnetic base provided with a magnetic layer based on finely divided magnetic material dispersed in binders and contain, as binders in the magnetic layer, special polymerizable, essentially linear, thermoplastic polyurethane elastomers which possess acrylate side and terminal groups, are crosslinked and are soluble in organic solvents.

Magnetic recording media for recording and playback of sound, image and data are known. Because of the constantly increasing requirements which these recording media have to meet, further improvements in magnetic and electroacoustic properties are necessary. For example, the trend toward higher recording densities in all the stated application forms frequently requires the production of relatively thin magnetic layers. For this reason, the packing density of the magnetic material in the magnetic layer, the residual induction in the recording direction, the homogeneous distribution of the magnetic material in the layer and the surface smoothness and uniformity of the layer have to be improved, since, in order to store signals faithfully to the original, the magnetic layer has to meet high requirements in respect of quality. The frequency components of a sound phenomenon at the upper limit of audibility are particularly important for recognition. A magnetic layer must therefore be able to store and play back these high and low frequencies without amplitude distortion.

In addition to possessing an extremely homogeneous distribution of the magnetic material in the organic binder, the layer must be magnetically highly sensitive in the recording direction. The anisotropy of the acicular pigment particles is utilized for this purpose. After an inert base has been coated, the Liquid dispersion of magnetic powder and organic binder solution is subjected to a magnetic field so that the magnetizable needles are oriented in the recording direction. The position of the particles in the binder film is fixed by the drying procedure carried out directly thereafter.

The distribution of the magnetic pigment in the organic binder and its orientation in the magnetic field are influenced by the nature of the polymer used, particularly where finely divided pigments are employed. The choice of organic binders and combinations of these for magnetic powders is large. For example, the use of polyacrylates, nylons, polyesters, polyurethanes, phenoxy resins, vinyl chloride/acrylonitrile copolymers and copolymers of vinyl chloride, vinyl acetate and vinyl alcohol is known. The majority of the polymers listed are relatively hard and brittle. However, the usual mechanical stress on the magnetic layer necessitates a flexible, frequently softer formulation. To this end, polyurethane elastomers are frequently combined with the relatively brittle polymers such as phenoxy resins, vinyl chloride/vinyl acetate copolmyers, polycarbonate, etc. To improve the running properties, the polymer mixtures are frequently crosslinked with polyisocyanates, and the hard resins concomitantly used therefore also frequently possess OH groups. However, when such binder systems are used the high solvent requirement, the long dispersing time, the two-phase dispersing procedure required and finally the crosslinking with polyisocyanates are all disadvantages. In particular, the addition of polyisocyanates results in difficulties during processing, since the viscosity of the dispersion increases and the shelf life of the dispersion is also considerably restricted. Moreover, such binder systems permit only poor orientation of the magnetic particles in the layer and therefore only a low residual induction and correspondingly poor electroacoustic properties of the recording medium.

In the surface coating sector, it is known that crosslinkable polyurethanes can be prepared by incorporation of unsaturated diols, such as butenediol. However, the reactivity of these double bonds is low, and crosslinking, which is frequently necessary, is therefore difficult to carry out. The preparation of polyurethanes having acrylate double bonds at the end of the polyurethane chain is also known, although this has the disadvantage that a high duuble bond content results in either the chains being too short or the polymers being too highly branched, both of which would lead to mechanically inferior recording media. If binders which possess only acrylate double bonds in side positions are used, the double bond-free ends of the molecule are not incorporated into the interior of the molecular compound and act as plasticizers. The result of this is that, in order to achieve the required tensile strength and modulus of elasticity, a very large number of double bonds in side positions would have to be incorporated, causing the crosslinking density to increase and the flexibility to decrease. This would result in properties which are unsatisfactory for binders for magnetic recording media, which would be evident from, for example, poor adhesion of the magnetic layer to the base.

It is an object of the present invention to provide magnetic recording media which exhibit an improvement in the magnetic properties, such as the residual induction in the recording direction, and in all electroacoustic data, such as sensitivity at short and long wavelengths, maximum output level at short and long wavelengths and improved signal to print-through ratio, for predetermined magnetic materials and with the use of special binders, the mechanical properties of the magnetic layer, such as frictional properties, adhesion and abrasion resistance, simultaneously meeting the high requirements. It is a further object of the present invention to prepare the magnetic dispersion in a more economical manner through processing advantages such as single-phase dispersing, short dispersing times and saving of solvents.

It is an object of the present invention, in particular, to produce the magnetic recording media using substantially linear, resilient, virtually uncrosslinked, highly reactive resins which are soluble before they have been processed and do not have the above disadvantages.

We have found that these objects are achieved, and that magnetic recording media which comprise a magnetic layer applied on a non-magnetic base and essentially consisting of a magnetic material finely dispersed in a crosslinked polymer binder have the required properties if the said binder is a polymerizable thermoplastic polyurethane which is soluble in organic solvents, possesses acrylate side and terminal groups, has a K value (measured on a 2% strength solution in dimethylformamide) of from 20 to 55 and is prepared by reacting poly- and/or diisocyanates with a mixture of
  (a) methacrylate- or acrylate-diols having molecular weights of from 146 to 3,000,
  (b) monoesters of methacrylic or acrylic acid and a diol having a molecular weight of from 116 to 300, and (c) other organic polydiol compounds which have molecular weights of from 400 to 5,000 and differ from (a), with or without (d) diols which differ from (a), diamines, aminoalcohols or triols having molecular weights of from 61 to 400, or water, in an NCO/OH ratio of from 0.9:1 to 1.1:1, with the proviso that from 1.4 to 10 moles of poly and/or diisocyanate, from 0.1 to 6 moles of components (a) and (b) and, where relevant, not more than 9 moles of component (d) are used per mole of component (c), and the unpigmented crosslinked film of the polymer binder has a tensile strength of $>15$ N/mm$^2$, an elongation at break of $>20\%$, a modulus of elasticity of $>150$ N/mm$^2$ and a pendulum hardness of from 30 to 140.

In developing the present invention, it was found to be advantageous if the ratio of components (c) and (d) is chosen in accordance with the properties of the individual building blocks, such as the molecular weight of the polyester diol and the types of chain extenders and isocyanates. The ratio of components (a) and (b) to components (c) and (d) determines the crosslinking density and is from 0.1:1 to <1:1, preferably from 0.1:1 to 0.6:1, particularly preferably from 0.1:1 to 0.5:1. The ratio of (a) to (b) can be varied within wide limits, but is advantageously from 0.05:1 to 1:0.1, preferably from 0.2:1 to 1:0.5.

The polymer binders are particularly advantageous if they are film-forming before crosslinking at 30° C. and possess from 0.1 to 1 acrylate double bond per 1,000 g of polymer and a K value (2% strength in dimethylformamide) of from 24 to 45, in particular from 26 to 40, and the unpigmented film crosslinked by means of electron beams has a tensile strength of $>25$ N/mm$^2$, an elongation at break of $>50\%$, a modulus of elasticity of $>200$ N/mm$^2$ and a pendulum hardness of from 30 to 100 s.

The polymer binders can be crosslinked by means of free radicals or ionically, as described in the literature. However, electron beam curing is preferred, this procedure causing little pollution, being very well defined and taking place rapidly.

To further improve the properties of the novel magnetic recording media, from 6 to 50% by weight of monomers or polymers containing C—C double bonds can be added to the mixture.

The polymerizable thermoplastic polyurethane elastomers thus characterized can be subjected to a high degree of polyaddition compared with the conventional crosslinkable synthetic resins. The polymerizable unsaturated groups are retained during and after the preparation of the polyurethane. Hence, a plurality of polymerizable unsaturated groups can be introduced into the substantially linear molecules which only possess very few terminal acrylate groups. In this way, the curability of the product is not reduced by a high degree of polymerization. In addition to these advantageous conditions in respect of the combination of the high degree of polymerization with good curing properties, the polymer binders possess improved resilience. In contrast, the conventional crosslinkable resins have disadvantages in particular with regard to their flexural properties, even where they fully meet the practical requirements in respect of hardness. This disadvantage is essentially attributable to the low molecular weights of these resins coupled with an excessive crosslinking density.

Moreover, the crosslinked elastomers are substantially superior to the uncrosslinked polyurethane resins in respect of their adhesion to metals and plastics, as are used in magnetic recording media, their resistance to water and solvents and their thermal stability. The unsaturated polyurethane elastomers additionally crosslinked by polymerization have a higher softening point than similar prior art elastomers.

Moreover, the polymer binders described result in the magnetic recording media according to the invention possessing substantially improved mechanical strength, adhesion and chemical resistance. These properties are attributable to the high molecular weight and the presence of the urethane bonds and of residual polymerizable unsaturated side groups and terminal groups in the molecule, and the crosslinking, preferably with electron beams.

By using these polymer binders, the dispersing time can be reduced to less than 30 hours in a single-phase dispersing procedure, without admixing physically drying surface-coating binders, such as phenoxy resins, epoxy resins, polyvinyl chloride, polyurethane elastomers, etc., and regardless of the magnetic material employed. However, it may be advantageous to admix such polymers for particular fields of use. Furthermore, the magnetic recording medium need only be passed once through the calender, and then under low pressure; it is also possible to save as much as 40% of the solvent compared with the binder systems used to date for high quality tapes.

In addition to possessing these advantages, the magnetic recording media also possess substantially better magnetic and electroacoustic properties than the commercial products. In the case of audio tapes based on $CrO_2$, the magnetic properties achieved are above the standard values for the saturation (Mm) of $>190$ mT, of remanence (Mr) $>175$ mT and of coercive force (Hc) of 39 kA/m, the orientation ratio (OR) being $>3.0$ (layer thickness 4–6 $\mu$m). Regarding the electroacoustic properties, improvements in the maximum output level at long wavelengths from 0.5 to 4 dB, the maximum output level at short wavelengths from 0.5 to 4 dB and in the signal to print-through ratio from +2 to +5 dB can be achieved, for example, for a $CrO_2$ tape in comparison with the reference tape C 401 R.

Similar improvements are also achievable with the other magnetic materials, such as iron, iron oxide and cobalt-doped iron oxide. The stated effects occur not only for auoio media but also for video and data media.

The magnetic layer of the novel magnetic recording media is produced from the crosslinked polymer binder and the magnetic material finely dispersed therein. According to the invention, a thermoplastic polyurethane which is soluble in organic solvents and possesses acrylate side and terminal groups is used as the binder to be crosslinked. The following components can be employed for its preparation:

Suitable polyisocyanates are the conventional compounds known from polyurethane chemistry, in particular diisocyanate. Aromatic, aliphatic or heterocyclic diisocyanates can be used, for example 4,4-diphenylmethane diisocyanate, dicyclohexylmethane diisocyanate, 1,5-naphthylene diisocyanate, 2,4- and 2,6-toluylene diisocyanate, hexamethylene diisocyanate, isophorone diisocyanate and trimethylhexamethylene diisocyanate. Diphenylmethane diisocyanate, isophorone diisocyanate, toluylene diisocyanate and dicyclohexylmethane diisocyanate are particularly suitable. In many special cases, it is also possible to use partially blocked polyisocyanates which permit the formation of polyurethanes which undergo additional crosslinking, for example dimeric toluylene diisocyanate, or polyisocyanates partially reacted with, for example, phenol, tert.-butanol, phthalimide or caprolactam.

Suitable components (a), ie. methacrylate-diols or acrylate-diols having molecular weights of from 146 to 3,000, are reaction products of epoxide compounds with polymerizable olefinically unsaturated carboxylic acids, in particular acrylic and methacrylic acid, the ratio of epoxide groups to carboxyl groups being about 1:1 in each case, and reaction products of dicarboxylic acids with polymerizable olefinically unsaturated glycidyl compounds, as described in, for example, German Laid-Open Application DOS No. 2,164,386.

Other suitable unsaturated acrylate-diols are reaction products of OH-containing monoepoxides, such as glycidol, with (meth)acrylic acid. Suitable polymerizable diols (polyols) can be obtained, for example, from epoxides having two terminal epoxide groups, of the general formula (also see U.S. Pat. No. 3,373,075)

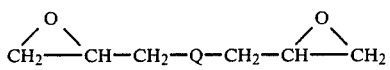

where Q is a divalent radical, eg. —O— or

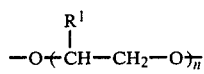

in which n is 1 to 10 and $R^1$ is hydrogen or methyl, ie. a radical derived from ethylene glycol or propylene glycol, a —O—$(CH_2)_m$—O— radical where m is 1 to 10, preferably 1 to 7, or a radical derived from polyethylene glycol or polypropylene glycol, or Q is a radical of the general formula

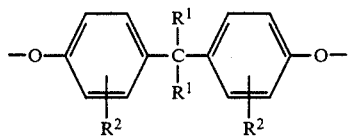

which can be derived from 4,4-dihydroxydiphenylmethane, bisphenol A or derivatives of these compounds which are substituted in the nucleus. During subsequent reaction with diisocyanates, the reaction products of the epoxide compounds with acrylic and/or methacrylic acid should be substantially bifunctional in respect of OH groups. With an OH functionality of 3, there is a danger of crosslinking.

The reaction between the epoxide compounds and the polymerizable olefinically unsaturated acid monomers is a ring-opening esterification between the epoxide groups of the diepoxide compounds and the carbonyl groups of the polymerizable (meth)acrylic acid, which can be carried out in a conventional manner roughly similar to that described in German Laid-Open Application DOS No. 2,164,386 (also see U.S. Pat. Nos. 3,373,075 and 2,824,851).

The above epoxide compounds and their reaction products can be used alone or as a mixture. Reaction products of bisphenol A diglycidyl ether or 2,3-epoxypropan-1-ol with acrylic or methacrylic acid are preferred.

Suitable compounds for component (b) are monoesters of acrylic acid or methacrylic acid and a diol having a molecular weight of from 116 to 300, eg. ethylene glycol monoacrylate, 1,2-hydroxypropylenecyclohexane monoacrylate, 1,3-hydroxypropylene glycol monoacrylate, butane-1,4-diol monoacrylate, butane-1,4-diol monomethacrylate, ethylene glycol monomethacrylate and decane-1,10-diol monoacrylate. Mixtures of such hydroxy compounds can also be used. Fairly high molecular weight alkanediols are only compatible with some of the polyurethanes and are therefore less suitable.

Polydiols which can be used as component (c) have molecular weights of from 400 to 5,000, preferably from 700 to 2,500, suitable compounds being the conventional polyesterols, such as adipates based on glycols, polycaprolactones or polyethers, for example those based on polytetrahydrofuran, or polycarbonates. Other suitable polyols are polytetrahydrofuran (molecular weights 1,000 and 2,000), polypropylene glycol (molecular weight 1,000), adipates with glycol (molecular weight 2,000), with diethylene glycol (molecular weight 2,000), with butane-1,4-diol (molecular weight 940), with hexane-1,6-diol and with 2,2-dimethylpropane-1,3-diol (molecular weight 1,000), or polycaprolactones (molecular weights 830 and 2,000) and polycarbonate (molecular weight 2,000). Advantageous polyesterols having a molecular weight of from 400 to 5,000 are predominantly linear polymers which possess terminal OH groups, preferably those having 2 terminal OH groups. The acid number of the polyesterols is less than 10, preferably less than 3. The polyesterols can be obtained in a simple manner by esterification of aliphatic dicarboxylic acids of 4 to 12, preferably 4 to 6, carbon atoms with aliphatic glycols, preferably those of 2 to 12 carbon atoms, or by polymerization of cyclic lactones of 3 to 6 carbon atoms. Aliphatic dicarboxylic acids which are suitable for this purpose are glutaric acid, pimelic acid, suberic acid, sebacic acid, dodecanedioic acid and preferably adipic acid and succinic acid. The dicarboxylic acids can be used individually or as mixtures. For the preparation of the polyesterols, it may be advantageous if, instead of the dicarboxylic acids, the corresponding acid derivatives, eg. carboxylates where the alcohol radical is of 1 to 4 carbon atoms, carboxylic anhydrides or carbonyl chlorides, are used. Examples of glycols for the preparation of polyesterols are diethylene glycol, pentanediol, decanediol and 2,2,4-trimethylpentane-1,5-diol. Ethane-1,2-diol, butane-1,4-diol, hexane-1,6-diol and 2,2-dimethylpropane-1,3-diol are preferably used.

In preparing the polymerizable polyurethanes, the component (d) can, if required, also be added. These are diols which dfffer from (a), or diamines, aminoalcohols or triols. The diols employed are compounds of 2 to 18, preferably 2 to 6, carbon atoms, examples being ethane-1,2-diol, propane-1,3-diol, butane-1,4-diol, hexane-1,6-diol, pentane-1,5-diol, decane-1,10-diol, methylpropane-1,3-diol, 2,2-dimethylpropane-1,3-diol, 2,2-dimethylbutane-1,4-diol, 2-methyl-2-butylpropane-1,3-diol, neopentylglycol hydroxypivalate, diethylene glycol, triethylene glycol and methylenediethanolamine.

The triols used are compounds of 3 to 18, preferably 3 to 6, carbon atoms, examples of these being glycerol, trimethylolpropane and hexanetriol. Low molecular weight reaction products of, for example, glycerol or trimethylolpropane with ethylene oxide and/or propylene oxide are also suitable.

The presence of small amounts (<10 mol %, based on OH components) of triols during the polyaddition reaction results in slight crosslinking of the end product, which, provided there is no excessive localized crosslinking, has an advantageous effect on the mechanical properties of the polyurethane and of the magnetic recording medium produced from it.

Examples of aminoalcohols of, preferably, 2 to 10 carbon atoms are monoethanolamine, diethanolamine, monoisopropanolamine, diisopropanolamine, methylisopropanolamine, ethylisopropanolamine, methylethanolamine, 3-aminopropanol, 1-ethylaminobutan-2-ol, 4-methyl-4-aminopentan-2-ol and N(2-hydroxyethyl)-aniline. Secondary aminoalcohols are particularly suitable because their addition at the chain end improves the solubility of the polymers. The films produced from these possess good mechanical properties after they have undergone crosslinking.

Examples of diamines are ethylenediamine, 1,6-hexamethylenediamine, 4,9-dioxadodecane-1,12-diamine, 4,4'-diaminodicyclohexylmethane and 4,4-diaminodiphenylmethane. Aminoalcohols according to claim 11 are, for example, monoethanolamine, monoisopropanolamine, methylethanolamine, 3-aminopropanol, 1-ethylaminobutan-2-ol and 4-methyl-4-aminopentan-2-ol.

In choosing the solvent, care should be taken to ensure that the solvent used for the preparation of the polyurethane material does not possess any functional groups which react with isocyanate groups under the reaction conditions. The stated polymer binders can be prepared using any solvent which does not react with the polyurethane material and the reactants. Preferred solvents are hydrocarbons, halohydrocarbons, ketones, tertiary alcohols, ethers, esters and nitriles, eg. acetone, methyl ethyl ketone, tert.-butanol, acetonitrile, ethyl acetate, methylene chloride, chloroform, carbon tetrachloride, N-methylpyrrolidone, dimethylformamide, dimethyl sulfoxide, tetrahydrofuran or dioxane. Mixtures of these solvents can of course also be used.

The polyurethanes are prepared under the conventional conditions for polyaddition reactions in the presence or absence of a solvent, these conditions being known from the literature.

Since the resulting polymer binders are generally processed in solution, the polyurethanes are advantageously prepared by solution polymerization, in a one-stage or two-stage process.

Examples of suitable catalysts for the preparation of the polyurethanes and for the crosslinking reaction are tertiary amines, such as triethylamine, triethyleneamine, N-methylpyridine or N-methylmorpholine, metal salts, such as potassium acetate, and organometallic compounds, such as dibutyl-tin laurate. The amount of catalyst used depends on the activity of the catalyst in question. In general, it has proven advantageous to use from 0.005 to 0.3 preferably from 0.01 to 0.1, part by weight per 100 by weight of polyurethane.

In the one-shot process, the starting materials are dissolved in some of the solvent to give solutions having a solids content of from 30 to 80% by weight. The stirred solutions are then heated at from 20 to 90° C., preferably from 30 to 70 °C. The components are reacted in an NCO/OH ratio of <1:1 until the NCO content falls to zero, after which the mixture is diluted to the desired end concentration. Where a slight NCO excess is present, the remaining NCO groups are reacted with a conventional terminator, such as a monoalcohol or a monoamine.

In the 2-stage polymerization process, the polyisocyanate is initially taken, and components (a), (c) and, if required, (d) and the catalyst and assistants and additives in the solvent are then added in the course of from 0.5 to 5 hours at from 20° to 90° C., preferably from 30° to 70° C. The components are reacted until the desired NCO content is reached, after which, in the 2nd stage, component (b) is added. In the 2-stage process, the first stage is carried out using an NCO excess, based on components (b), (c) and (d). The procedures described are intended to illustrate the preparation of the polymers but not to restrict it. The K value (according to H. Fikentscher, Cellulose-Chemie 30 (1931), page 58 et seq.) of suitable polyurethane products is from 20 to 55.

The solution of the acrylate-containing polyurethane binder is further processed with magnetic material and conventional assistants in a conventional manner to give magnetic recording media.

The magnetic pigments used are the conventional ones, examples of suitable magnetic pigments being gamma-iron(III) oxide, finely divided magnetite, undoped or doped ferromagnetic chromium dioxide, cobalt-doped gamma-iron(III) oxide and ferromagnetic metals and metal alloy pigments, such as alloys of iron and cobalt. Preferred magnetic pigments are acicular gamma-iron(III) oxide and ferromagnetic chromium dioxide. The particle size is in general from 0.2 to 2 $\mu$m, preferably from 0.3 to 0.8 $\mu$m.

The magnetic layers may furthermore contain small amounts of conventional additives, such as dispersants and/or lubricants, as well as fillers, these being admixed during dispersing of the magnetic materials or preparation of the magnetic layer. Examples of such additives are fatty acids and isomerized fatty acids, such as stearic acid or its salts with metals of main groups one to four of the periodic table of elements, amphoteric electrolytes, such as lecithin, and fatty acid esters, waxes, silicone oils, carbon black, etc. The additives are employed in a conventional amount, in general in an amount of less than 10% by weight, based on the magnetic layer.

The polymerizable polyurethanes are generally used as the sole binders for the production of magnetic layers. They possess K values as high as 40 and permit very short dispersing times.

The novel recording materials generally contain from 1 to 10, in particular from 3 to 6, parts by weight of magnetic pigment per part by weight of the binder or binder mixture. A particular advantage of the novel mixture is that the excellent pigment binding capacity of the polyurethanes permits high magnetic pigment concentrations in the magnetic layers without adversely affecting the mechanical properties or causing the performance characteristics to deteriorate noticeably.

Suitable non-magnatic and non-magnetizable bases are the conventional rigid or flexible base materials, in particular films of linear polyesters, such as polyethylene terephthalate, in general in a thickness of from 4 to 200 $\mu$m, in particular from 6 to 36 $\mu$m. Recently, the use of magnetic layers on paper bases for electronic computing and accounting machines has also become important.

The novel magnetic recording media are produced in a conventional manner. To do this, the magnetic material in a solution of the electron beam-curable binder in an organic solvent is converted to a dispersion in a dispersing apparatus, with the use of other conventional assistants. The magnetic dispersion is then applied onto the non-magnetic base with the aid of a coating apparatus, eg. a knife coater, a roller coater, a reverse roll coater or a spray coater. The conventional bases can be used as the non-magnetic base. For special applications, it is also possible to use polyimide films.

Before the still liquid coating mixture is dried on the base, a step which is advantageously carried out in a conventional oven at from 50° to 100° C. in the course of from 15 to 120 seconds, the magnetic particles are, if required, oriented along the intended recording direction by the action of a magnetic field. This may, if required, be followed by very slight partial polymerization of the coating with electron beams, using a dose of less than 6, preferably less than 2, kGray, or with UV light. In the latter case, it is also necessary to use a conventional highly absorbing photoinitiator. The magnetic layers are then calendered and compacted on conventional apparatuses by passing them between heated and polished rollers, if necessary under pressure and at from 30° to 80° C., preferably from 50° to 70° C.

An advantage here is that milder conditions than those employed for conventional tape recording media are adequate. The thickness of the magnetic layer is then in general from 0.5 to 20 μm, preferably from 1.5 to 10 μm for tapes and from 0.5 to 3 μm for disk-type recording media.

Curing of the magnetic recording layer is effected by means of accelerated electrons. The procedure employed here is one conventionally used in the case of other coating processes. Electron accelerators having an acceleration voltage of from 150 to 300 kV can be used, both scanner units and linear or planar cathode units having a radiation output of more than 500, preferably more than 1,000, kGray/sec being suitable. The radiation time or tape speed is controlled so that the magnetic coating is exposed to an energy dose of from 15 to 90, preferably from 25 to 60, kGray. The dose required for optimum polymerization of the double bonds is in most cases about 30–45 kGray for binders which at the same time possess good mechanical properties. Lower curing doses may be advantageous for magnetic tape applications, and higher ones for disk applications.

The Examples which follow illustrate the invention. In the Examples and Comparative Experiments, parts and percentages are by weight, unless stated otherwise.

EXAMPLE A 100.05 g of 2,4-toluylene diisocyanate dissolved in 123.9 g of tetrahydrofuran were initially taken in a stirred flask and heated at 62° C. A solution of 150.0 g of a polyester of adipic acid and butane-1,4-diol, having a molecular weight of 1,000, and 32.45 g of hexane-1,6-diol in 200 g of tetrahydrofuran, as well as 46.29 g of a 71.6% strength Epikote 828 diacrylate in tetrahydrofuran, were then added in the course of 2.5 hours at 62° C., while stirring. One drop of a commercial catalyst was added to the mixture at the beginning and at the end of the addition. After 3 hours, the NCO content was still 0.97%. 21.6 g of butanediol monoacrylate dissolved in 168.6 g of tetrahydrofuran were then added so that, after further stirring at 60° C., the NCO content dropped to zero. Finally, 0.3 g of a commercial stabilizer was added. The end product had a solids content of 40%, a viscosity of 300 cp and a K value (measured on a 2% strength solution in dimethylformamide) of 31.

EXAMPLE B 137.55 g of diphenylmethane diisocyanate dissolved in 137.5 g of tetrahydrofuran were initially taken in a stirred flask and heated at 62° C. A solution of 160.0 g of a polyester of adipic acid and butane-1,4-diol, having a molecular weight of 1,000, and 21.6 g of butane-1,4-diol in 226 g of tetrahydrofuran, as well as 61.7 g of a 71.6% strength Epikote 828 diacrylate in tetrahydrofuran, were then added in the course of 2.5 hours at 62° C., while stirring. One drop of a commercial catalyst was added at the beginning and at the end of the addition. After 3 hours, the NCO content was still 0.8%. 14.4 g of butanediol monoacrylate dissolved in 168.6 g of tetrahydrofuran were then added so that, after further stirring at 60° C., the NCO content dropped to zero. Finally, 0.3 g of a commercial stabilizer was added. The end product had a solids content of 50% and a K value of 38 (measured on a 2% strength solution in dimethylformamide). The product gelled at room temperature but did not undergo crosslinking.

EXAMPLE C 100.05 g of 2,4-toluylene diisocyanate dissolved in 100 g of tetrahydrofuran were initially taken in a stirred flask and heated at 62° C. A solution of 200 g of a polyester of adipic acid and butane-1,4-diol, having a molecular weight of 1,000, and 18 g of butane-1,4-diol in 260 g of tetrahydrofuran, as well as 61.7 g of a 71.6% strength Epikote 828 diacrylate in tetrahydrofuran, were then added in the course of 2.5 hours at 62° C., while stirring. One drop of a commercial catalyst was added at the beginning and at the end of the addition. After 3 hours, the NCO content was still 1.2%. 21.6 g of butanediol monoacrylate dissolved in 168.6 g of tetrahydrofuran were then added so that, after further stirring at 60° C., the NCO content dropped to zero. Finally, 0.3 g of a commercial stabilizer was added. The end product had a solids content of 50% and a K value of 29.5 (measured on a 2% strength solution in dimethylformamide).

EXAMPLE 1

450 parts of a 40% strength polyurethane acrylate solution as described in Example A, 900 parts of chromium dioxide having a coercive force of 39.3 kA/m, 947 parts of a 1:1 tetrahydrofuran/dioxane solvent mixture, 0.9 part of silicone oil and 22.5 parts of zinc oleate were dispersed for 72 hours in a ball mill having a capacity of 6,000 parts by volume and charged with 8,000 parts by weight of steel balls having a diameter of from 4 to 6 mm. The resulting dispersion was filtered under pressure through a filter having 5 μm pores and then applied onto a 12 μm thick polyethylene terephthalate film by means of a conventional knife coater.

The coated film was passed through a conventional magnetic field to orient the magnetic particles and then dried at from 60° to 80° C. Thereafter, the magnetic layer of the coated film was compacted and calendered by being passed twice between heated rollers at 60° C. and under a nip pressure of 35 kg/cm. The thickness of the magnetic layer was then 4.8 μm. The coatings were then cured using an electron beam in a dose of 70 kGray. The coated film was then slit into 3.81 mm wide audio tapes, and the latter were subjected to magnetic, electroacoustic and mechanical tests. The surface roughness of the coated film was determined as an average peak-to-valley height $R_z$, according to DIN 4768, sheet 1. In the case of the recording characteristics, the electroacoustic properties according to DIN 45,401,45, 403 and 45,512 (sheet 12) were tested with reference to the standard tape T 308 S. The results are shown in the Table.

EXAMPLE 2

The procedure described in Example 1 was followed, except that the 300 parts of the polyurethane acrylate solution according to Example A were replaced by 240 parts of the polyurethane acrylate solution according to Example B. The results are shown in the Table.

EXAMPLE 3

The procedure described in Example 1 was followed, except that the 300 parts of the polyurethane acrylate solution according to Example A were replaced by 240 parts of a polyurethane acrylate solution according to Example C. The results are shown in the Table.

TABLE

| | Examples | | |
|---|---|---|---|
| | 1 | 2 | 3 |
| $H_c$ [kA/m] | 39.3 | 39.3 | 39.3 |
| Mm [mT] | 206 | 199 | 201 |
| Mr [mT] | 181 | 175 | 179 |
| Orientation ratio | 3.4 | 3.2 | 3.2 |
| $R_z$ | 0.199 | 0.21 | 0.205 |
| $E_T$ [dB] | 1.8 | 1.7 | 1.8 |
| $E_H$ [dB] | 2.2 | 2.0 | 2.3 |
| $A_T$ [dB] | 3.7 | 3.5 | 3.4 |
| $A_H$ [dB] | 3.8 | 3.5 | 3.6 |
| $RG_A$ [dB] | 0.1 | 0.3 | 0.5 |
| signal to print-through ratio [dB] | 2.9 | 2.4 | 2.6 |
| deposition test before and after storage at high temperature and humidity | 1.8/2.5 | 1.6/2.0 | 1.9/2.4 |
| Uniformity of signal level | 100 | 100 | 100 |
| Adhesion cN | 15 | 12 | 16 |
| Quasistatic friction | 0.22 | 0.17 | 0.19 |

We claim:

1. A magnetic recording medium comprising a magnetic layer which is applied on a non-magnetic base and essentially consists of a magnetic material finely dispersed in a crosslinked polymer binder, wherein the latter is a polymerizable thermoplastic polyurethane which is soluble in organic solvents, possesses acrylate side and terminal groups, has a K value (measured on a 2% strength solution in dimethylformamide) of from 20 to 55 and is prepared by reacting poly- and/or diisocyanates with a mixture of
   (a) methacrylate- or acrylate-diols having molecular weights of from 146 to 3,000,
   (b) monoesters of methacrylic or acrylic acid and diols having a molecular weight of from 116 to 300, and
   (c) other organic polydiol compounds which have molecular weights of from 400 to 5,000, and differ from (a)

in an NCO/OH ratio of from 0.9:1 to 1.1:1, with the proviso that from 1.4 to 10 moles of poly- and/or diisocyanate and from 0.1 to 6 moles of componentsr (a) and (b) are used per mole of component (c), and the unpigmented crosslinked film of the polymer binder has a tensile strength of >15 N/mm², an elongation at break of >20%, a modulus of elasticity of >150 N/mm² and a pendulum hardness of from 30 to 140.

* * * * *